United States Patent [19]

Weekley

[11] Patent Number: 4,458,175
[45] Date of Patent: Jul. 3, 1984

[54] MOSAIC ADDITIVE REFLECTANCE COLOR DISPLAY SCREEN

[76] Inventor: Robert R. Weekley, 23662 Coronel Dr., Mission Viejo, Calif. 92691

[21] Appl. No.: 28,191

[22] Filed: Apr. 9, 1979

Related U.S. Application Data

[63] Continuation-in-part of Ser. No. 787,097, Apr. 13, 1977, abandoned, and a continuation-in-part of Ser. No. 455,025, Mar. 29, 1974, abandoned.

[51] Int. Cl.³ ............................................. H01J 29/10
[52] U.S. Cl. ...................................... 313/472; 313/470
[58] Field of Search ........................ 313/470, 466, 472

[56] References Cited

U.S. PATENT DOCUMENTS

| | | | |
|---|---|---|---|
| 2,213,382 | 9/1940 | Busse | 96/118 X |
| 2,243,828 | 5/1941 | Leverenz | 250/80 |
| 2,757,228 | 7/1956 | Tomer | 313/472 X |
| 2,762,943 | 9/1956 | Mayer | 313/466 |
| 2,817,767 | 12/1957 | Rosenthal | 250/71 |
| 2,898,495 | 8/1959 | Michlin | 313/472 |
| 3,147,699 | 9/1964 | Land | 101/211 |
| 3,212,887 | 10/1965 | Miller et al. | 96/1.2 |
| 3,275,828 | 9/1966 | Mittelstaedt | 96/82 X |
| 3,320,417 | 5/1967 | Alburger | 250/71 |
| 3,344,301 | 9/1967 | Kaplan | 313/472 |
| 3,458,309 | 7/1969 | Gaynor | 96/1.2 |
| 3,681,221 | 8/1972 | Snelling | 204/181 |
| 3,745,398 | 7/1973 | Oikawa | 313/472 |
| 3,748,515 | 7/1973 | Kaplan | 313/472 |
| 3,825,763 | 7/1974 | Ligtenberg et al. | 250/486 |
| 3,856,550 | 12/1974 | Bens et al. | 252/301.4 R |

OTHER PUBLICATIONS

Thire, "Fluorescent Multicolor Additive System," Def. Pub. T893,003; 9830G 401; 12/14-71.

Primary Examiner—David K. Moore
Attorney, Agent, or Firm—Ralf H. Siegemund; Herbert H. Mintz; Daniel L. Dawes

[57] ABSTRACT

The enhancement of the intrinsic viewing screen brightness of the Mosaic Additive system of color reproduction, sufficient for saturated reflectance color displays to be viewed comfortably by the ambient light, is taught. The enhancement comprises three means which may be employed severally or in combinations, to wit:

I. Photoluminescent compositions in the color elements.
II. Juxtaposed subtractive primaries with the additive primaries, as color elements.
III. Variable (optical) density interstices.

It is within the contemplation of the invention to effect an image, in cooperation with the viewing screen of this invention, by any suitable mechanical, electrical and/or chemical impression technique where it is desired to produce a Mosaic Additive color image for viewing with the unaided normal human eye by reflected ambient light. Such uses include: reflectance color—Television, Printing, Facsimile, Photography, and Xerography. The invention also specifies adaptations, of otherwise black and white embodiments of these reflectance imaging means, to color.

10 Claims, 7 Drawing Figures

MOSAIC ADDITIVE REFLECTANCE COLOR DISPLAY SCREEN

REFERENCE TO RELATED APPLICATION

This is a continuation-in-part of my copending applications Ser. No. 787,097, Apr. 13, 1977 and a continuation-in-part of Ser. No. 455,025, Mar. 29, 1974, and now abandoned. The content of these applications is incorporated herein by reference.

BACKGROUND OF INVENTION

This invention relates to the use of the Additive system of color for color reproduction. More particularly, this invention relates to a Mosaic Additive system of color so that color displays of an original image can be made in a single impression on a substantially opaque substrate to be viewed by reflected light.

The reproduction of color is a highly intriguing combination of arts whose roots extend back scientifically to the year 1861 with Clerk Maxwell's demonstration of the tristimulus principle of color vision for which he produced the world's first color photograph.

The theory presented by Maxwell forms the basis for virtually all commercially viable color reproduction systems, including: Television, Printing, Facsimile, Photography and Xerography.

Maxwell's theory embraces a system of color analysis and reproduction called Additive. The theory is that the light receptors in the human eye are of three basic types, each sensitive to a different part of the visible spectrum, which through refinement and standardization are today known as the primary colors red, green and blue (also known as blue-violet).

These primaries, Maxwell showed, represent a saddlepoint of efficiency. Whereas a large number of separate colors may otherwise be needed to create a multicolored image, substantially the entire gamut of saturated hues can be synthesized by combining a minimum number of standard colors in various ratios.

In practice, Maxwell photographed a multicolored ribbon three successive times on three separate black and white photosensitive plates, making each exposure through one of three different color filters—red; green; blue—while not moving either the camera or the subject. These plates were then developed to yield three black and white positive transparencies. Each positive was then placed in a separate slide projector, which contained a color filter, red, green or blue, that corresponded to the color of the filter through which each particular plate was originally exposed. When the images were projected in registration, a full color reproduction of the original subject was seen.

In 1868, Ducos du Hauron invented a simple and practical way to use Maxwell's Additive system without the cumbersome necessity of taking three separate photographs or setting up three separate projectors.

Du Hauron replaced Maxwell's apparatus with a single plate called a Mosaic Screen plate upon which were affixed an evenly distributed single layer array of minute red, green and blue color filter elements. Each element was so small that it could not be discerned by the naked eye, and so when viewed in aggregate, these evenly distributed color elements fused optically to appear a neutral gray. A highly commercially succesful type of Mosaic Screen plate at the turn of the century, the Lumiere Autochrome, used bleached and dyed starch grains for filter elements.

In practice, the filter elements were fixed to a clear glass substrate, a panchromatic photosensitive black and white emulsion was coated over the filter elements, the plate then placed in a camera so that the light must pass through the elements to reach the emulsion, and exposed to a color scene. The exposed plate was then reverse-processed to yield a positive tristimulusly coded black and white record of the subject, which since it is in point-to-point correspondence with the color filter elements to which it is attached, produced a color copy of the original.

The operation of the system is briefly as follows: In a red area from the original color image, light will pass only through the red elements of the mosaic, and the unexposed areas behind the green and blue areas become black. Thus, since the red elements are over clear spots and the blue and green elements over black spots, only red light can be seen on viewing through this area. The intensity of the red light making the exposure of the emulsion layer controls the degree to which it will develop (by reversal) to a clear area. Thus, the tone of the red is controlled and properly reproduced. Similar reasoning holds for the green and blue filters. Since all the filter elements are extremely small, the picture viewed by transmitted light looks like a full color picture in hue and tone.

The Mosaic Additive system works well, and satisfactory examples of the color fidelity of pictures made by this process can be seen in the Time-Life book, "Color Photography" (ISBN 0-8094-1019-2) at pp. 71–76, and in the cathode ray tube color television sets presently on the market. The Mosaic Additive system, however had not been suitable for viewing as reflectance displays, since in an area of a given color, two-thirds of that area must be blocked out to hide the unwanted colors making the picture too dark to be useful.

In the search for a way to make reflectance color displays, a complementary system of color imaging, the Subtractive system, was discovered.

The Subtractive system is basically the Additive process in reverse, and is used presently to produce by the billions the color photographs and color printing used throughout the world. It is a multiple step process where the colors are superimposed one over another to block, or subtract out, those not wanted.

The Subtractive system uses the so-called "subtractive primaries" magenta, yellow and cyan, also known as the complementary or "minus" colors. They represent what white light looks like if one or another of the red, green or blue primaries is taken away. Thus, magenta is "minus" green, or white with the green removed. It is a combination of red and blue, which are at opposite ends of the visible spectrum. Cyan is "minus" red, or white with the red removed. It is a continuum of colors blue through green. Similarly, subtractive yellow is white with the blue removed, leaving the visible colors green through red.

The subtractive primaries are also known as broadband colors. These bands include a large enough number of wavelengths of light to encompass two-thirds of the visible spectrum each. This means that they have colors in common. For example, the additive primary red can be derived from the broadband subtractive primaries yellow and magenta by superimposing them as color filters in a beam of white light. The yellow filter allows all colors except blue; the magenta allows all except green. Since blue and green are blocked by one or the other of these filters, red is the only color seen because it is the only color passed by both filters.

This phenomenon is true for other combinations as well. Yellow and cyan superimposed subtract out all but green; and magenta and cyan all but blue. It takes all three filters to subtract out all colors, which gives black.

Photography and printing have both taken advantage of this phenomenon, as has color photocopying such as Xerox's model 6500 color machine. Photography uses the Subtractive Tri-pack with three layers of photosensitive emulsion coated one over the other on a substrate. Color printing similarly uses assembly type overprinting to achieve the finished product.

There are at present several types of black and white reflectance image display processes. The adaptation of these processes to color reproduction would be highly advantageous. Photocopying machines, for example, are accessable to virtually everyone. However, until this invention, there has been no known, practical way in which to utilize these readily available black and white photocopying machines for the production of color copies of multi-color original documents, prints, charts, maps, advertising layouts, pictures and the like.

I have discovered that contrary to what has been believed by those skilled in the arts up until now, the Mosaic Additive system can be used for the production of true multi-colored reflectance copies of original images in otherwise conventional black and white processes. I have recognized that the principle problem with the Mosaic Additive system in this context is that its brightness is too low to be useful for viewing by reflected light. My invention solves the problem by increasing the intrinsic viewing screen brightness sufficient to render the Mosaic Additive system useful in the production of reflectance color displays.

This invention accordingly relates to methods for enhancing the brightness of the Mosaic Additive system to an extent sufficient that color reproductions made with this system using a single black image impression can be viewed comfortably as reflectance copy when illuminated by the ambient light. There is provided a viewing screen which takes advantage of those methods and may comprise a substantially opaque, white substrate on which is formed a mosaic of color elements which act additively to the eye and which can be used to form a reflectance color copy of an original color image.

In addition, the invention relates to methods of color reproduction using the Mosaic Additive color system to form reflectance color copies.

Objects and advantages of this invention are set forth in part in the description and in part will be obvious from the description or may be learned by practice of the invention. The objects and advantages of the invention may be realized and attained by means of the instrumentalities, combinations, compositions, articles, and methods particularly pointed out in the appended claims.

SUMMARY OF THE INVENTION

To achieve the objects and advantages of the invention in accordance with the preferred embodiment thereof, it is suggested to provide a viewing or display screen, receptor, sheet, paper, or the like (hereinafter called a viewing or display screen), comprising a substantially opaque, substantially white, substrate, base, stock, paper, sheet, or the like in definite or indefinite length (hereinafter usually called a substrate) together with a nonimaged pattern, mosaic, array, or reseau of preferably daylight fluorescent color elements being sufficiently small so that, as seen by an observer, they act additively to the eye. These elements include particular ones of additive primary colors, separated from each other by areas and color elements of subtractive primary colors. This viewing or display screen is seen through, or against, or is positioned in any other optical relation to an image-defining separation record (overlay) being composed of discrete areas outlining and defining such an image in terms of non-color-selective variable transmissivity and/or reflectance, for selectively altering the optical density of individual ones of the color areas of the mosaic system as seen by the viewer, so that a color image can be viewed comfortably when the mosaic system is illuminated solely by ambient light.

"Viewed comfortably" in this context means that the Mosaic Additive system herein described achieves significantly more, distinctive, combined average brightness and saturation in comparison to a standard subtractive process reflection color display.

The separation record is, basically, a transparent sheet or layer, containing areas of reduced transparency and being contoured corresponding to the shape of the additive and subtractive color elements of the mosaic to selectively block such elements individually and completely or partially to the exclusion of other adjacent elements. This overlay or separation record may be permanently affixed to the display screen or may remain separate therefrom.

The image-defining areas of the separation record will mask discrete mosaic areas and are positioned over or on such mosaic areas. Alternatively, the separation record bears image-defining areas which are dark and are disposed underneath particular ones of the nonimaged display screen mosaic color elements to attenuate any reflection through them.

The display screen must be provided with means for significantly enhancing the brightness of the additive-acting mosaic pattern of color elements, functioning in conjunction with a substrate, to provide sufficient, i.e., enhanced, intensity of the unmasked color elements of the screen to render them usefully visible to the human eye, particularly when seen by reflected ambient light. Brightness is enhanced by several means used preferably in combination; they are (1) the use of photoluminescent compositions in the color elements, whereby particularly daylight fluorescent dyes should be used exclusively, and, most importantly, (2) the hue-biasing of color elements to form color areas which visually are the subtractive and additive primaries magenta, yellow, cyan, red, green, and blue. Additional brightness enhancement can be achieved (3) by varying the optical density of the interstices between the color elements. In order to obtain a suitable separation record, a taking screen is provided, being constructed as a filter mosaic having nonimaged filter elements corresponding geometrically to the viewing screen, at least as far as primary colors are concerned.

The specific problem with the brightness of the Mosaic Additive system is that each of the red, green and blue (i.e. blue-violet) color elements or filters only allow one-third of the visible light falling on them. This means that the brightest white produced by this method is only one-third as bright as the white light falling on it. A pure color correspondingly allows only one-ninth of the incident light because it not only allows only one-third of the light, but occupies only one-third of the area.

One means of enhancing the brightness of the viewing screen in accordance with this invention is to use photoluminescent compositions in the color elements. Since the reproduction is to be viewed by reflected light, the color elements do not comprise a transparency for viewing purposes. Therefore, luminescing compositions which add substantial brightness to conventional colorants become especially useful.

It is believed that luminescence works by transfering energy. In application to the teachings of this invention, there are photoluminescent compositions that can absorb both visible and near-visible light energy otherwise wasted and convert it to visible light of the desired color. These color photoluminescing pigment and dye compositions actually emit light as does a color television cathode ray picture tube. However, whereas television phosphors are activated by electrons inside the tube (electronoluminescence), in competition with the ambient light, and must be viewed in subdued light, the compositions used in the practice of this invention are activated by the ambient light (photoluminescence) and therefore increase their emission(s) with each increase in ambient light.

The visible and near-visible ambient light energy necessary to cause luminescence adequate for use in the practice of this invention is present in sufficient amounts in most standard light sources such as fluorescent and incandescent lamps and natural sunlight.

Suitable luminescing pigments and phosphors are presently available from such firms as the Day-Glo Color Corporation of Cleveland, Ohio and the General Electric Corporation of New York.

Preliminary background information on the 'daylight' type of fluorescing (luminescing) compositions which can be used in the practice of the invention are disclosed in the 'Encyclopedia of Chemical Technology', Second Edition, Vol. 9, 1966, John Wiley and Sons, Inc., (ISBN 0-470-48431-4) which lists 72 germain books, articles, reviews and patents at pp. 483–506 therein.

A second means by which the viewing screen brightness of the present invention can be increased is to juxtapose the broadband subtractive primaries (magenta, yellow, cyan) with the additive primaries (red, green, blue) to form sets of six-color units as the screen—a color unit is the smallest area that contains elements of all the different colors.

As a measure of color element brightness, the National Television System Committee has published the specifications for relative subjective intensities of the six additive and subtractive primary colors as percentages of white. The additive's are: Red 30%, Blue 11%, Green 59%, which when added equal 100% or white. The subtractive primary relative intensities are computed by taking the additive primaries in pairs, to wit: Magenta (red and blue) 41%, Yellow (red and green) 89%, and Cyan (blue and green) 70% which when summed equal 200%. The Subtractives are twice as bright as the additives. The subtractives are also less saturated than the additives, and this loss of saturation makes them unsuitable for the Mosaic Additive process by themselves. A viable compromise of both brightness and saturation is achieved with reflectance displays by a combination six-color unit as stated above. There is some loss of saturation but it is offset by the gain in brightness.

A third means for increasing viewing screen brightness in accordance with this invention is to make the interstices between the color elements, where they exist, capable of being varied in optical density to corresponding points of the original. Prior practice has been to fill the interstices with an opaque black to avoid desaturating the image with white light as is achieved in the Lumiere Autochromes, which employed carbon black for the purpose, and is most recently evident in the "black surround" promoted in connection with color television picture tubes. I have found, however, that variable density interstices can be used to advantage to enhance the brightness of the Mosaic Additive process by having them respond to the gray scale of the original so that a brighter color image can be obtained.

A Mosaic Additive screen in accordance with the present invention can be provided without interstices. In such a case the use of luminescing compositions leads to a good reproduction. Especially preferred is the use of the juxtaposed additive primary/subtractive primary color reseau described above. Formation of an array without interstices requires a more exacting registration of the color elements to each other, and it is usually economically preferable to dispense with the precision necessary to avoid intersticial areas on the viewing screen of this invention particularly when the color elements are formed by highly efficient mechanical printing methods such as rotogravure. Where interstices are formed, the use of variable density interstices helps to produce satisfactory color copies. It is preferred that variable interstices be used in conjunction with one or the other, or both of the other, brightness increasing techniques in combination.

The present invention therefore provides a viewing screen for making reflectance color reproductions comprising an additive-acting mosaic system of color elements with a substrate, the system being sufficiently bright that an image resulting from the action of a single substantially achromatic, substantially complete color content, separation record that acts to selectively alter the optical density of the color elements of the viewing screen, corresponding in both color and pattern information to the original image, can be viewed by reflected ambient light.

The substrate of the viewing screen may be any substantial base such as paper or the like, including photoconductive paper for direct image electrophogotraphy. The substrate may be a single ply or a laminate, and may be coated or uncoated. Any available conventional base material can find utility as a substrate in accordance with the invention.

The color system may be formed as an overcoating of color elements on the substrate. The system acts additively to the eye. The colorants used in the color element compositions may be of at least two colors to result in color areas of at least two of the three additive primaries and with or without uncolored interstices. Preferably, the appearance of the non-imaged system to the unaided eye is essentially a light neutral gray.

In accordance with the invention, the color array provides a graded saturation/brightness screen, from the narrow band additive primaries, through the broadband subtractive primaries, to the full-band interstices. The grading may be continuous such as can be achieved with intaglio printing, or discrete such as by offset, for example.

Summarily, the Additive color system of the viewing screen is enhanced in brightness by using the combination of two, or all three brightness-increasing means.

In the presently preferred embodiment of this invention, the mosaic is an array of both additive primary color and subtractive primary color areas, all the color areas formed from color elements having photoluminescent compositions, with the optical density of the interstices between the elements (where they exist) capable of being varied in point correspondence with the optical density of the original image.

Viewing screens made in accordance with this invention can be used in many color reproduction processes. For example, dynamic images can be displayed using black liquid crystals (LCD's), similar to those found in some of the newer watches and clocks, in cooperation with the reflectance color screen of the present invention. Facsimile reproduction can be produced in color by coordinating the impinging of the black images to register over corresponding color areas of a pre-printed (paper) Mosaic Additive viewing screen whose brightness has been enhanced as described herein, and used to receive the facsimile transmitted image. Color printing can similarly be effected using only a single impression of black ink if the image is coordinated to register on a sheet pre-printed with a non-imaged viewing screen made in accordance with the principles of the present invention. Such uses for printing including newspapers and "quick print" type reproduction.

With respect to printing, one or more 'color blocks' (viewing screens) can be pre-printed on the paper at the mill or by a converter. The entire stock is then warehoused for later use. At use, the pre-printed paper is fed into a conventional black impression press wherein the format is printed as conventionally done. Where a color picture is desired, such as on the front page of a newspaper, the color-coded black image of the desired picture is coordinated to register with the Mosaic Screen 'color block' of the present invention pre-printed in that area, and a color picture results. Printing presses with photoelectric registration require no capital modification to utilize this color system. Four-color printing presses can form the color screen on three of the units and image with the black plate; changing the black plate then changes the color image.

Photocopying, as mentioned above herein, also lends itself to color reproduction by the methods of the present invention. By modifying the photoconductive paper used in the direct image or "charged paper" photocopying process, that process can be effected in the conventional manner to yield color reproductions. The drum transfer electrophotographic process can also effect single step color reproduction if the conventional drum transfer machines contain the provisions of: (a) panchromatic type photoconductive drum, such as is now available from Xerox Corporation, Stamford, Conn.; (b) taking screen which spacially separates the light of the original image into its constituent colors; (c) registration system which keeps the viewing screen and the taking screen aligned, and; (d) panchromatic type exposure lights. In accordance with this embodiment, the viewing screen is the ordinary white, substantially opaque, (paper) stock used in drum transfer electrophotography such as xerography, overcoated with a non-imaged mosaic of minute color elements as heretofore described.

This invention is especially advantageous is that most any conventional black and white processing apparatus can be employed for color reproduction by using special paper as I have described. The initial and continuing costs in capital and maintenance time arising from the use of special machinery which requires separate color applications will be prohibitive in most cases. I have therefore discovered a simple and inexpensive way to render color displays to all to whom black and white displays are presently available.

In keeping with the concepts of the invention, there are provided methods of color reproduction using the Mosaic Additive system enhanced in brightness as heretofore described. In general, an original color image may be reproduced in both color and pattern in accordance with this invention by providing a viewing screen comprising a non-imaged additive-acting mosaic of minute color elements with a substrate; and impressing a color-coded black image, in point-to-point information correspondence with the original color image, onto the viewing screen. The viewing screen used in the color reproduction methods of this invention is one in which the Additive Mosaic is enhanced in brightness by the combination of two, or all three of the brightness-increasing means heretofore described. It is within the contemplation of the invention to effect impression of an image, which corresponds point-to-point with the original image, on the viewing screen by any suitable mechanical, electrical, or chemical impression technique, or combinations thereof, including electrophotography, photography, printing television, facsimile, billboards, microfilm, and the like. The impressed image is of a substantially neutral tone, including black, such as that of carbon black, dark gray, or even brown.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

Figure 1:
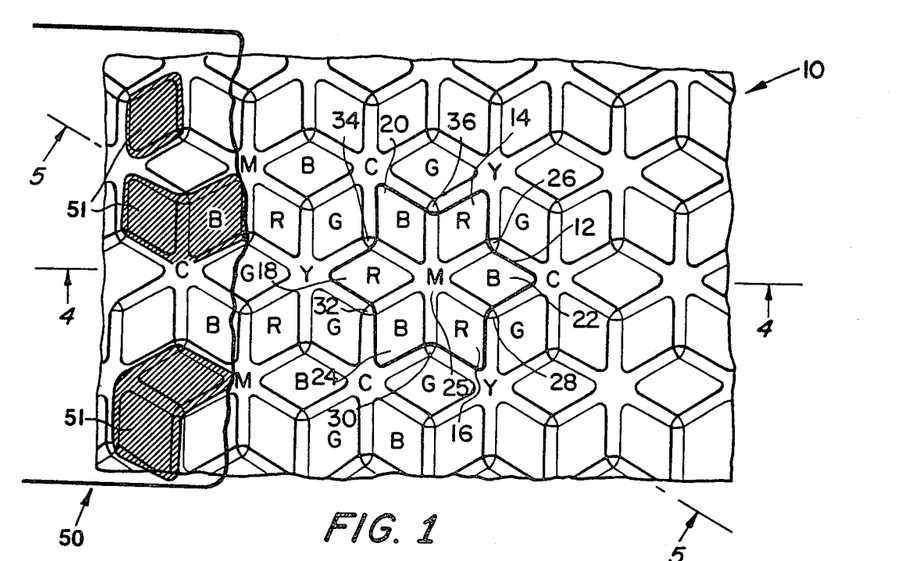
FIG. 1 is a fragmentary plan view of a portion of a viewing screen constructed in accordance with one embodiment of this invention.
Figure 4:
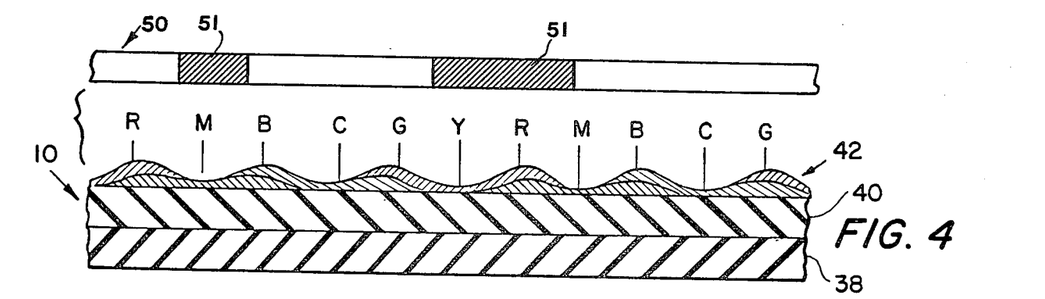
FIG. 4 is a section taken along line 4—4 of FIG. 1.
Figure 5:
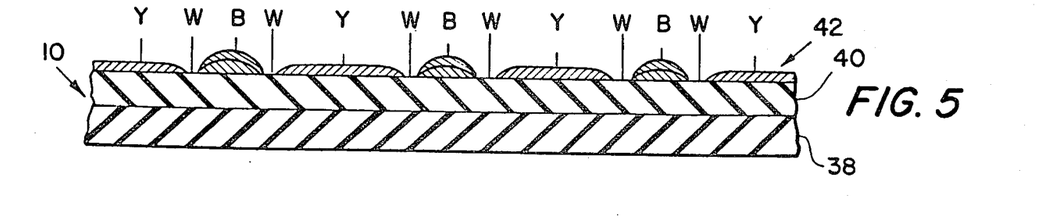
FIG. 5 is a section taken along line 5—5 of FIG. 1.

As illustrated in FIGS. 1, 4 and 5 of the drawings, there is provided a viewing or display screen 10 which may be used to receive image elements 51 impressed by any suitable means 50 as detailed below. FIG. 1 illustrates a nonimaged mosaic array which is exemplary of the patterns of color elements which may be used to form the Mosaic Additive color system of the viewing screens of this invention. As shown and embodied in FIG. 1, the Mosaic Additive array of viewing screen 10 is formed by overlapping color elements of the subtractive primaries magenta (M), yellow (Y), and cyan (C) to form an additive primary color-subtractive primary color system in accordance with one means of enhancing the brightness of the Mosaic Additive system in keeping with the concept of this invention. The color elements, however, should be daylight fluorescing to further enhance their visibility. Additive primary color elements in this pattern are of rhombic contour, and they are repeated by bands of elements of subtractive primary color.

Figure 2:
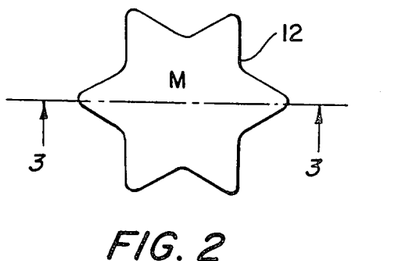
FIG. 2 is a plan view of a single color element of FIG. 1.

In the viewing screen shown in FIG. 1, the color elements are applied in the form of six-point, star-shaped dots, such as magenta dot 12. FIG. 2 is a plan view of the magenta color element 12 of FIG. 1. Careful inspection of FIG. 1 will reveal that the array is formed of overlapping elements having the same shape as that of the element shown in FIG. 2 and being formed of the three subtractive primary colors overlapped in an orderly pattern.

The precise shape of the color element dot is not critical, and in addition to the form of array depicted in FIG. 1, and the shape of element shown in FIGS. 1 and 2, the color mosaic may be formed as a nonimaged pattern of other shapes such as circles, lines (FIG. 6), triangles, squares, pentagons, hexagons, amorphous, etc. The elements are preferably arranged in a pattern so that adjacent elements are of different color. However, a random or pseudo-random (to eliminate statistical clumping) mosaic may also be used, and the elements can also be made of random or pseudo-random sizes. Preferably, they are selected as to size and shape so that the overall viewing screen appears to the unaided eye a substantially continuous gray rather than a mosaic of color elements.

The size of an individual color element may be varied. It is presently preferred, although it is not essential to achieve satisfactory color copies, that the element size of an orderly non-imaged pattern may be as small as possible to achieve maximum resolution and to minimize moire interaction with any dot patterns on the original to be reproduced. The star-shaped dots shown in FIGS. 1 and 2 are particularly advantageous in this regard in that they allow each individual dot as applied to be over six times larger than those resultingly seen. As shown in FIG. 1, magenta dot 12 overlaps adjacent yellow dots to form the three (3) red (R) areas 14, 16, and 18, and overlaps adjacent cyan dots to form the three (3) blue (B) areas 20, 22, and 24, all within the confines of dot 12. Where there is no overlapping of adjacent six-point star-shaped dots, a six-leg magenta-colored shape 25 forms within the magenta dot 12. Magenta dot 12 is emphasized in FIG. 1 solely for illustrative purposes.

As an alternative to the use of the subtractive primary colors to form the color elements in partial overlap fashion, color elements of non-overlapping additive primaries may be employed to form the mosaic array. The imposition of subtractive primary color areas on the viewing screen adds brightness when seen juxtaposed with the additive primary color areas as described in the summary above. Moreover, the use of the subtractive primary colors to form elements that overlap to result in both additive primary and subtractive primary color areas is economically advantageous since the application of three colors of compositions results in a viewing screen containing six colors. It is also within the contemplation of the invention to form additive primary and subtractive primary color areas by applying both the additive primary and subtractive primary color elements separately.

As embodied in FIG. 1, the Additive Mosaic system illustrated therein has interstices 26, 28, 30, 32, 34 and 36 outside of the individual six-point star-shaped dots where there is no overlapping of the dots. The spacing of the color elements that creates the interstitial areas shown in FIG. 1 allows room for tolerance, such as slight misregister as can occur in mechanical printing processes which are contemplated to be used to form the overcoated array of this invention. Where interstices are formed, they are capable of varying in optical density in point-to-point correspondence with equivalent areas of the original image. As disclosed herein, this is one means of increasing the brightness of the Mosaic Additive array.

Figure 3:
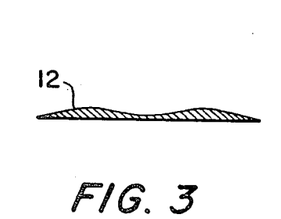
FIG. 3 is a section taken along line 3—3 of FIG. 2.

FIG. 3 shows a section of color element 12 taken along line 3—3 of FIG. 2. The color element 12 in FIG. 3 has thickness, and as shown and embodied in FIG. 3, tapers at its middle and its ends. The tapering structure shown in FIG. 3 is advantageous in the present invention and can be achieved by gravure printing of the color elements on the stock of the viewing screen as is explained below.

FIG. 4 is a section taken along line 4—4 of FIG. 1 and shows the pattern of color areas formed by the overlap of the subtractive primary color elements. As illustrated in FIG. 4, viewing screen 10 comprises base 38 coated with an optional formulation 40 which may be either a resin as found on conventional coated paper, or in the case of direct image photocopying a photoconductive composition. The overcoating 42 has areas of red (R), blue (B), and green (G) formed where there is the correct overlap of two of the magenta (M), cyan (C), and yellow (Y) color elements.

FIG. 5 is a section of viewing screen 10 taken along line 5—5 of FIG. 1 and as embodied and shown in FIG. 5, the single layers of yellow (Y) in overcoating 42 are separated from the overlap areas that form blue (B) by interstitial areas (W) which are optically the white of the base 38 optionally coated with layer 40.

The color elements are formed into a Mosaic Additive array on a substrate, such as a sheet of conventional paper, for example, as illustrated in the drawings. The array may be applied by any suitable method such as by printing of the compositions onto a substrate. Thus, the color element compositions are a dispersion of various ingredients and may be applied to the substrate by methods generally known in the art for the application of printing inks, for example, to a substrate. Suitable methods include the successive silk screening or spraying of the different dispersions through a stencil which has the pattern of openings corresponding to the desired non-image pattern to be produced on the substrate. Metal foil stencils can be used instead of silk.

In accordance with this invention, it is preferred that the color elements be applied to the base or substrate by rotogravure, a technique well known in the art. Rotogravure printing is especially advantageous because, unlike other processes, it can produce vignetted edges on the applied color elements, as illustrated in FIGS. 3 and 4 of the drawings, allowing a color and sensitivity tapering with respect to both the elements and the results obtained by their combination, which act to halftone structure the image. The quality of the reproduction is thereby improved.

For printing the mosaic onto a photoconductive paper, the rotogravure print process is particularly suitable. It is designed to use fairly volatile inks, thus enabling sufficient solvent to be mixed into the color element composition to assure penetration of the compositions of the color elements into the photoconductive coating of the paper to increase its sensitivity and conductivity to compensate for the narrowed bandbass of the colorants in the elements.

In forming the nonimaged pattern of color elements by any printing method, such as rotogravure printing, it is especially preferred to use the subtractive primary color elements magenta, yellow, and cyan which are arranged in a pattern of partial two-color overlaps to give a six-color additive primary/subtractive primary color mosaic. This minimizes the number of separate compositions that must be formulated and applied as discussed above. For example, as can be seen in the illustrative mosaic shown in FIGS. 1, 4, and 5, the mosaic includes areas of cyan overlapped by yellow to create a green area which exists because the cyan blocks red light and yellow blocks blue light. Likewise, where there is an overlap of cyan and magenta color elements, the additive primary color blue is formed, and there is an overlap of yellow and magenta so that the additive primary color red is formed. While the mosaic is thereby constructed by employing the Subtractive color process and primaries, it results in an Additive process screen because the rather small color elements as viewed are integrated by the eye and act additively to form the color image when the screen is subsequently imaged. This type of screen employs the hue-biased technique of color mosaic elements which have been found to be an optimum brightness/saturation compromise in accordance with the concept of this invention.

In FIGS. 1 and 4 of the drawings, reference numeral 50 refers to an overlay, having discrete areas 51 which are opaque and, selectively and individually, block off particular ones of the color elements of areas. These areas 51, in toto, define and establish an image in 'BLACK AND WHITE.' The residual, uncovered areas establish the color of and for that image. As is explained below, this selective blocking-off can be carried out in various ways because physical overlay is not essential. Essential is the selective blocking-off (or at least significantly attenuating) any visible radiation returned by the colored areas in ambient light. This separation record, or overlay 50, has been produced by means of a taking screen being a filter assembly in accordance with a pattern contoured precisely as the viewing screen, except that the color elements in the viewing screen are reflective while identically contoured filter elements of the taking screen are transmissive at exactly the corresponding color.

Figure 6:
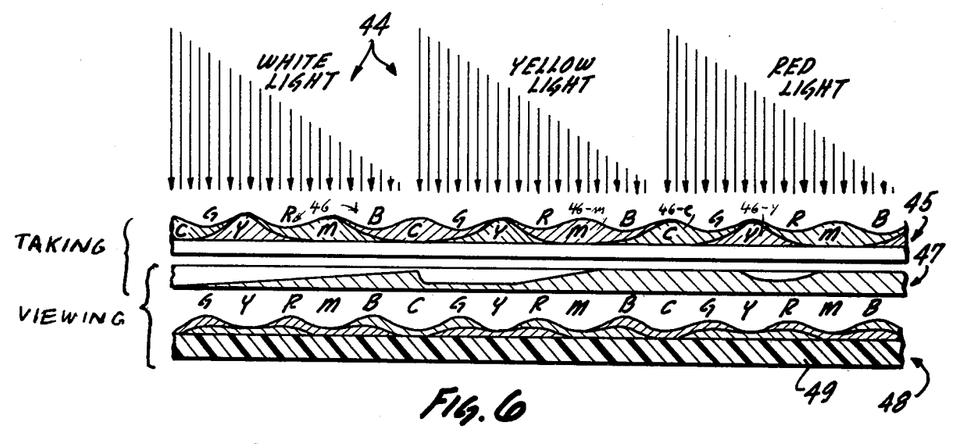
FIG. 6 is an exemplary illustration of a method of imaging a continuous tone 'overlay' of this invention.

With reference to FIG. 6, the imaging of the instant invention may best be illustrated by considering the figure from top to bottom. As schematically shown, an image pattern is caused to impinge upon the surface of the taking screen 45 as indicated by the arrows 44. The relative length of the arrows 44 is intended to represent relative light intensity, e.g., the higher the intensity, the longer the corresponding arrow.

The incident light encounters the taking screen 45 which is composed of line-shaped filters, each acting to block or to pass light, depending upon the color characteristics of the light and upon the spectral transmittance of the respective filter elements. The filter elements are line-shaped in the sense that they extend in parallel to each other and transversely to the plane of the drawing. They are composed of zones being transmissive to yellow (46-Y), magenta (46-M), and cyan (46-C). Adjacent elements of these substractive color filters overlap to produce green, red, and blue filter effects. A repetition pattern is established transversely to the extensions of the lines in which a single series includes a cyan, a green, a yellow, a red, a magenta, and a blue filter, the latter being established by combined filter action of the magenta element and the cyan element of the next series, etc.

It should be noted that the filter elements are laterally modulated in density and, thus, do not have sharply defined boundaries. The subtractive primaries are, moreover, denser than the additive primaries.

It can be seen that monochromatic blue light will be passed by composite blue filter elements, blocked by the red and green elements and attenuated by respectively adjacent portions of the magenta and cyan filter elements. Red will be passed by the red elements, but blocked by the blue and green elements and attenuated by the respectively adjacent yellow and magenta elements. Green will pass the green elements, but not the red and blue elements and will be attenuated by the respectively adjacent cyan and yellow filter elements. In the case of polychromatic light such as white light, for example, the different color components will be passed by the corresponding filter elements.

Light which is passed by the taking screen 45 strikes the non-color-selective, photosensitive recording medium 47 and exposes the area so illuminated. The degree of recording medium exposure will be proportional to the intensity of the light to which the area is exposed. This has been schematically illustrated in the recording medium 47 where, for example, in those areas associated with the monochromatic red light, no exposure is received in those areas which are associated with blue and green filter elements while the amount of exposure in the areas associated with the red filter elements is proportional to the intensity of the red light incident thereupon. Some exposure is effective in portions of medium 47 adjacent to the yellow and the magenta filters. Corresponding behavior for yellow and white light is also shown. In the areas which are not illuminated, no exposure is made, as shown.

After exposure to the light pattern or image of colored light, the photosensitive recording medium 47 is separated from the taking screen and developed in a normal manner, as is well known in the graphic arts for standard black-white recording mediums, to reveal a 'black and white' image. This overlay 47 is a separation record and is now used in conjunction with a display or viewing screen 48. This display or viewing screen is composed of an opaque backing 49, upon which are placed color elements which form a line pattern. It is important that this line pattern, in particular the width of the individual lines as well as the spatial repetition rate transversely to the extension of these lines, corresponds exactly to the line pattern of the taking screen 45. Moreover, the reflective color elements on backing 48 are highly fluorescent under daylight and incandescent light. Thus, as the separation record 47 is overlayed in registration with the viewing screen 48, it reveals a true reflectance color reproduction of the original image which can be viewed comfortably when illuminated solely by the ambient light. The viewing screen, moreover, exhibits a density distribution which is reversely modulated as compared with the taking screen. This way, one compensates variations in color band pass on account of different densities. The viewing screen is preferably produced by printing lines on the substrate. Each line has the same thickness, except for edge flattening. Since the primary colors result from printing one secondary color on top of another, different densities are produced and the taking screen (filter elements) should be and are designed to compensate that modulation.

Figure 7:
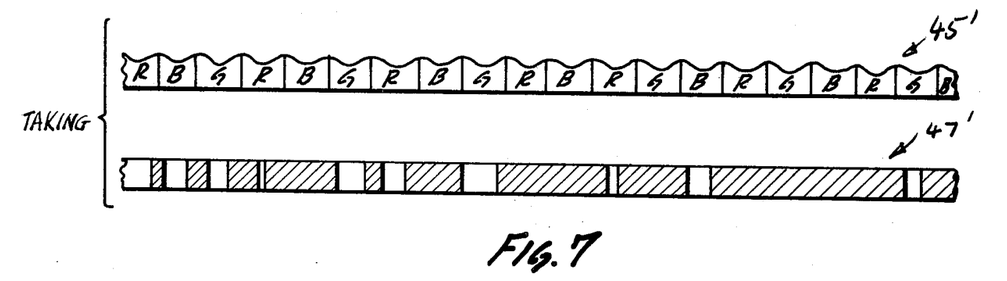
FIG. 7 is the illustration of FIG. 6 with a high gamma structured image 'overlay'.

It should be noted, however, that the taking screen could be simplified by using only primary colors. FIG. 7 shows a modification of FIG. 6 to provide for modulation of the recording medium by half-tone structuring, for use with high gamma image processes such as is commonly known and used in the graphic arts industry. In FIG. 7, taking screen 45' provides for graded density color areas for direct exposure of high gamma structured recording medium 47'. A self-developing (i.e., Polaroid-type) system of this type provides great utility in the application of the instant invention to the graphic arts industry where high gamma processes are routinely used.

FURTHER DETAILS OF THE PREFERRED EMBODIMENT

The enhancement of the viewing screen brightness of the Mosaic Additive system of color for reflectance color reproduction is herein described in detail with respect particularly to the three specific means—PHOTOLUMINESCENT COMPOSITIONS; BROADBAND subtractive COLOR primaries; VARIABLE DENSITY INTERSTICES—for achieving that end. The invention also specifies herein embodiments for the SCREEN STRUCTURE, and MEANS FOR IMAGING the enhanced brigtness reflectance color screen by Xerography, Electrophotography, Printing, Photography, Facsimile, and Television where the color displays are effected with a single substantially achromatic image.

With respect to the brightness increasing means; PHOTOLUMINESCENT COMPOSITIONS are provided in the color elements as described in the foregoing summary to convert light energy otherwise wasted to wavelengths of the desired colors for the purpose of increasing the energy output of the color elements to enhance the brightness of reflectance color display screens in accordance with the concepts of the present invention. The McGraw-Hill Encyclopedia of Science and Technology, (c)1971 by McGraw-Hill, NY, NY, (ISBN 07-079798-6) defines Luminescence as:

" . . . light emission that cannot be attributed merely to the temperature of the emitting body. Various types of luminescence are often distinguished according to the source of the exciting energy. When the light energy emitted results from a chemical reaction, such as in the slow oxidation of phosphorus at ordinary temperatures, the emission is called chemiluminescence. When the luminescent chemical reaction occures in a living system, such as in the glow of a firefly, the emission is called bioluminescence. In the foregoing two examples part of the energy of a chemical reaction is converted into light. There ae also two types of luminescence that are initiated by the flow of some form of energy into the body from outside. According to the source of the exciting energy, these luminescences are designated as cathodoluminescence, or electronoluminescence if the energy comes from electron bombardment; radioluminescence or roentgenoluminescence if the energy comes from x-rays or from v-rays; photoluminescence if the energy comes from ultraviolet, visible or infrared radiation; and electroluminescence if the energy comes from the application of an electric field. By attaching a suitable prefix to the word luminescence, similar designations may be coined to characterize luminescence excited by other agents. Since a given substance can frequently be made to luminesce by a number of different external agents, and since the atomic and electronic phenomena that cause luminescence are basically the same regardless of the mode of excitation, the subdivision of luminescence phenomena into the foregoing catagories is essentially only a matter of convenience, not of fundamental distinction . . .

"A second basis frequently used for characterizing luminescence is its persistence after the source of exciting energy is removed. Many substances continue to luminesce for extended periods after the exciting energy is shut off. The delayed light emission (afterglow) is generally called phosphorescence; the light emitted during the period of excitation is generally called fluorescence. In an exact sense this classification based on the persistence of the after glow is not meaningful because it depends on the properties of the detector used to oberve the luminescence. With appropriate instruments one can detect afterglows lasting no more than a few thousandths of a microsecond, which would be imperceptible to the human eye. The characterization of such a luminescence as either fluorescence or phosphorescence therefore depends upon whether the observation is made by eye or by instrumental means . . . Fluorescence may be defined as a luminescence emission having an afterglow duration which is temperature-independent. Phosphorescence may be defined as a luminescence with an afterglow duration which becomes shorter with increasing temperature."

Two basic phenomena associated with luminescence; Stoke's effect—where the wavelengths of energy absorption are shorter than the wavelength(s) of emission, and anti-Stoke's effect—where the wavelengths of energy absorption are longer than that of emission; can contribute to the luminescent brightness of the present invention. There are many substances which may exhibit Stoke's and anti-Stoke's luminescence; cadmium sulfide, as an example, is known to emit visible light by activation from both effects.

It should be stated here that luminescence is an art of great scope, and there is much literature on the subject. The present invention is not directed to the particular luminescent materials and compositions themselves, but rather employing by combination those materials, suitable in the Mosaic Additive system of color reproduction, to permit reflectance color displays to be viewed comfortably by the ambient light.

Photoluminescing compositions that are both commercially available and suitable for use in the practice of the instant invention are of the 'daylight fluorescent' type. 'Daylight fluorescence' according to the Encyclopedia of Chemical Technology (ibid), fluoresces "in response to radiation in both the ultraviolet and visible ranges" of wavelengths which comprise a large portion of daylight. Specific compositions which have demonstrated the requisite saturation and brightness to work in the instant invention are fluorescent pigments marketed by Day-Glo Color Corporation of Cleveland, Ohio, and Hercules Incorporated of Wilmington, Delaware, which match those colors listed under the Pantone Standardized Color Matching System, Pantone Company, Incorporated, N.Y., N.Y., as: Pantone Nos.

801(cyan), 802(green), 802(yellow), 805(red), 807(magenta), and 813(blue-violet). Other colors will also work, 804(orange) for example.

With respect to a second brightness increasing means: BROADBAND COLORS are provided according to the present invention to form graded brightness vs. saturation viewing screen color elements. Although a color element's saturation density can be varied across its diameter from panchromatic to monochromatic without changing hue, the present invention employs a hue-biased saturation gradiant where selected adjacent areas of an additive primary color element are desaturated in specific directions (hue-vectored) with wavelengths of light comprising substantially only one of the other two additive primaries. An additive primary desaturated equally with wavelengths of a second additive primary is identical in spectral composition to white light with the third additive primary removed; which is a description of the complementary 'minus' colors, defined herein the summary above, whose pragmatic embodiments are the three substractive primaries magenta, yellow and cyan.

The advantage, other than brightness, of hue-biased color element desaturation gradients are threefold: First, subtle intermediate hues can be achieved, both saturates and pastels, by combining full strength, discrete, hue-biased saturation gradient colors additively in fixed ratios. For example, equal Mosaic Additive areas of the subtractive primary color yellow juxtasposed with the additive primary color red fuse optically to the eye in the screen of the instant invention to appear orange. This is an example of color synthesis.

This arrangement can theoretically synthesize one-hundred twenty-eight ($2 \wedge 7 = 128$) hue/saturation permutations using binary structured (half-tone) deposition of black over entire selected elements of the six-color-units, plus interstices, of the viewing screen of the instant invention, making it ideal for Mosaic Additive color image reproduction by intrinsically high-gamma processes such as offset printing, photocopying, etc.

A second advantage of six-color-unit hue-biased saturation density gradients is the correspondence they have to standard reflectance color processes. The Subtractive process is so named partly because it uses the subtractive primaries to produce by the billions the reflection color reproductions mentioned above herein the summary. The present invention employs the same six colors found in these Subtractive type displays thereby matching most closely, albeit metamerically, by the 'identical dye' type method of color reproduction, the colors of the original to aid in achieving a more faithful color copy.

The third advantage of hue-biased color elements is that a viewing screen employing them can be created on a substrate by conventional color printing means. The three additive primary colors of the non-imaged viewing screen of the instant invention can be created by overlapping the subtractive primary colors in pairs, as is known in the subtractive color printing art.

The third brightness increasing means: VARIABLE DENSITY INTERSTICES is in theory the limiting case of the desaturation density gradient of the additive primaries. In practice, however, interstices were a residual byproduct in the Lumiere Autochromes of less than perfect starch grain color element packing densities. In color television cathode ray picture tubes, interstices are necessary between the color elements to provide separation to counteract the effects of overspray from the electron guns and secondary emission resulting from electron bombardment of the color phosphors. In the instant invention, the interstices are created as a tradeoff toward brightness to hedge against unnecessarily darkening the screen of the instant invention, so that critical registration can be eased in viewing screen manufacture to permit tolerance for slight misregister as can occur in the highly efficient mechanical printing methods, contemplated herein below, for manufacturing the nonimaged screen of the instant invention.

The SCREEN STRUCTURE itself may take many physical forms, providing it permits Mosaic Additive reflectance color displays to be viewed comfortably by the ambient light. A typically preferred embodiment comprises a substantially opaque, substantially white substrate such as paper or the like, including synthetic paper as is marketed by Kimberly-Clark Corporation of Neenah, Wis., under the trademark "Kimdura", overcoated with a mosaic of photoluminescent colorants such as "Rocket Red extra," No. 77-13X; "Saturn Yellow extra," No. 77-17X; "Signal Green extra," No. 77-18X; "Horizon Blue," No. 77-19X; "Corona Magenta extra," No. 77-21X, etc., manufactured by Day-Glo Color Corporation of Cleveland, Ohio.

With respct to IMAGING by TELEVISION, Hughes Aircraft Company, Culver City, Calif. has developed a liquid crystal black and clear display (Electronics, Nov. 22, 1973, p. 34) with approximately 100 elements to the inch (0.25mm each). Imposing the Hughes display over the screen of the instant invention in register produces a reflectance color television display when the display elements are coordinated, as is well known in the television art, to produce a color picture.

Magnavox Government and Industrial Electronics Company, Fort Wayne, Ind. is working on a matrix addressable magnetic slate (Electronics, Apr. 29, 1976, p. 41) similar to one offered by Edmund Scientific Company, Barrington, N.J. in their 1973 mail order catalogue as product number 72,065 therein. The slate, panel or board relies on tiny black magnetic particles coated on one half or side with reflective materials and suspended in a medium between two plates, at least one which must be transparent. Coating the reflective side of the magnetic particles on the panel with photoluminescent colorents according to the concept of the instant invention produces a reflectance Mosaic Additive color display when the particles are addressed to rotate under a magnetic field in correspondence with the color information impressed thereon as is known, once the brightness enhancement techniques of the instant invention are revealed, to those skilled in the addressable magnetic particle display art.

With respect to IMAGING by PRINTING, a preprinted sheet (or roll) of paper, or other suitable substrate, with the non-imaged mosaic pattern of color elements prepared according to the concept of the instant invention is over-printed with black ink in an image coordinated to register in color information with the position of the respective color elements of the enhanced brightness screen, as is known by those skilled in the Mosaic Additive art and described herein the summary above.

With respect to IMAGING by FACSIMILE, a non-imaged reflectance mosaic enhanced in brightness according to the concept of the instant invention is inserted in the facsimile receiving apparatus as a sheet to accept the black image in register with the color information. A non-imaged mosaic pattern of lines is the best pattern for simplest registration where the lines are orthagonal to the direction of scan, as would be apparent once explained, to those with skill in the facsimile imaging art.

With respect to IMAGING by PHOTOGRAPHY, 10 second instant color photography is possible employing the Mosaic Additive system, by attaching to and exposing the presently available self developing "instant" type panchromatic black and white emulsion through an 'integral screen' constructed in accordance with the present invention, and adhering the imaged mosaic to a substrate. Fluorescent brighteners have been employed in photographic base papers for years to prevent yellowing of the white substrate, however, the instant invention employs luminescent compositions to increase the base brightness even further to enhance the Mosaic Additive color system sufficient to permit reflectance color reproductions of original images to be viewed comfortably by the ambient light. Luminescent compositions can be provided in the color elements themselves, except where they would interfer with the taking process by luminescing too strongly during exposure.

With respect to IMAGING by ELECTROPHOTOGRAPHY, two processes are contemplated; drum transfer XEROGRAPHY, and the DIRECT IMAGE, usually zinc oxide, photoconductive process.

Electrophotography essentially involves forming an electrostatic charge over a photoconductive surface, projecting an image on the surface thereby creating a charged latent image, developing the latent image by treating the charged surface with oppositely charged toner in the wet or dry state, and fixing the developed image by either drying wet toner or fusing dry toner as the case may be.

In the DIRECT IMAGE process of electrophotography, the copy paper itself is photoconductive, and this process can be used to produce reflectance color copies of color originals by simply overcoating the photoconductive paper with a Mosaic Additive viewing screen enhanced in brightness by the methods of the present invention.

A Mosaic Additive non-imaged color screen imposed on, and remaining attached to, a substrate and serving both as a "taking screen", to control the color exposure of the photosensitive substrate, and as a "viewing screen", in cooperation with the developed image to present a color picture, is termed an "integral screen". The advantage of integral screens is that they obviate registration difficulties between the "taking" and "viewing" processes, since the screen remains attached to the photosensitive compositions throughout exposure, development and viewing. The direct image Mosaic Additive color process of electrophotography of the present invention employs such an "integral screen".

To make an integral screen of this invention useful for making direct image color copies, such as that shown in the drawings, a photoconductive sheet is coated with an array of minute color elements which may be either the additive primaries red, green and blue or the subtractive primaries, magenta, yellow and cyan superimposed in partial overlap to create a six-color additive primary color/subtractive primary color mosaic.

Color elements useful in accordance with this invention are compositions which both impart color to specific minute areas of the photoconductive sheet on which they are coated, and select the sensitivity of the conductive, usually zinc oxide, coating of the sheet to light of their respective colors. In accordance with one embodiment of this invention, a color element composition comprises a mixture of a colorant, photoconductive material, dye sensitizer which makes the photoconductor of the color element and the coating selectively more light responsive to the color of the colorant, binding resins, and solvent.

In addition, the color element composition may contain other materials as may be known in the art for improving the properties of the overcoated sheet in its use in electrophotographic processing. Such materials include those which enhance the electrical properties of the photoconductive coating and which do not interfere with the operation of the color element in accordance with this invention. These additional materials are known in the art and are not critical to this invention.

The colorant used in accordance with the concept of my invention is presently preferably a daylight fluorescent colorant composition, since these suitable fluorescent pigments are commercially available in each of the colors needed for the practice of this invention.

The photoconductor used in the composition of the color elements will usually be zinc oxide, although other photoconductors are known in the art, e.g., indium oxide, and mercuric oxide. The present invention, in fact, enables the use of photoconductors that may otherwise have had to been rejected due to their undesirable intrinsic color, although the photoconductor(s) used in the composition of the color elements may advantageously be the same as the photoconductor in the photoconductive coating of the conventional direct image charged paper.

Dye sensitizers of selective color for photoconductors are well known in the art. Since the dye sensitizer performs the same functions in the color elements of this invention as it does in other systems where the sensitivity of a photoconductor to specific colors is to be enhanced, conventional sensitizers can be used in my invention.

Known dyes for sensitizing the photoconductor to red light include the triphenylmethane dyes, e.g., Patent Blue V (C.I. 42045) and Victoria Blue B (C.I. 44045); for sensitizing to green light include the exanthene dyes, e.g., Pyronine B (C.I. 45010) and Rhodamine G (C.I. 45150), as well as the azine and cyanine dyes; and for sensitizing to blue light include the diphenylmethane dye Auramine (C.I. 41000) and the acridine dye Acridine Yellow (C.I. 46025).

The resin in the composition acts as a binder for the components and also serves to bind the color element composition to the photoconductive paper. Known binders for compositions containing photoconductors may be used in forming the color elements of this composition. Such binders include Pliolite, a styrene-butadine copolymer having a weight ratio of 70:30 to 85:15, polystyrene, chlorinated rubber, polyvinyl chloride, etc.

An especially advantageous binder is a conductive resin such as marketed by DeSoto Chemical Corporation of Des Plains, Ill., under the trade designation "C-113", although other conductive compositions may work just as well. When a conductive resin is used, it is not necessary to have a separate photoconductive constituent in the color element formulation. It is also not essential, but still preferred, to have dye sensitizers in the composition when a conductive resin is employed.

An inert diluent of solvent, such as toluene, is used in a small amount to facilitate the formation of the composition into a despersion. Of course, the particular solvent selected will depend on the ingredients, such as specific binder, included in the composition formulation.

In the composition of the color elements, mixtures of materials may be used, such as mixtures of binders, dye sensitizers etc. It is possible to sensitize the subtractive primary color elements to the two additive color primaries which they span. For example, a cyan color element comprises both blue and green. The cyan color element composition can include both a dye sensitizer which sensitizes the photoconductor in the composition to blue light and a dye sensitizer which sensitizes the photoconductor in the composition to green light. Likewise, the yellow and magenta color elements can include two or more dye sensitizers, each of which sensitizes those color elements to the respective color components of which they are formed.

In general, compositions known per se in the art which can be applied to a support to give selectively light responsive areas are useful in the present invention, provided the brightness enhancing means of the present invention are employed and a Mosaic Additive array is formed as described herein. For example, U.S. Pat. No. 3,212,887, entitled "Laterally Disposed Coterminously Adjacent Multi-Color Area Containing Graphic Reproduction Receptor and Electrophotographic Process of Using Same" issued to C. S. Miller et al, which is directed to a subtractive-acting color reproduction process, discloses compositions which are useful in the present invention if modified and applied as taught herein.

The color elements are formed into a Mosaic Additive array on a substrate, such as a sheet of conventional photoconductive copy paper. The array may be applied by any suitable method such as by printing the compositions onto the substrate, for example as described herein above under "screen structrure".

The tapered dot structure shown by way of example in FIG. 3 of the drawings is advantageous, to effect penetration of the color element composition into the photoconductive substrate, as one way of assuring the proper relative balance of sensitivity and conductivity between the different color areas and the intersticial areas. The additive primary color areas have the greatest degree of penetration since there exists more composition then in the subtractive primary color areas due to overlap and element thickness as shown in FIG. 4 of the drawings. There is substantially no penetration in the intersticial areas, as illustrated in FIG. 5 of the drawings, for example. Thus, the color element compositions, which highten sensitivity and conductivity, do so to the greatest degree in the additive primary color areas, to a relatively lesser extent in the subtractive primary color areas, and have substantially little or no effect in the intersticial areas. As a consequence discharge is greatest, for a given equal energy exposure, in the additive primary color areas and is least in the interstices which has the effect of structuring the image to compensate for the intrinsically high gamma of photoconductors such as zinc oxide, which is a desired result.

As a second way of assuring proper relative balance of sensitivity and conductivity among the color elements where only the subtractive primary color elements are applied to the sheet in partial overlap to form the six-color matrix, each subtractive primary color element composition is formulated so that its sensitivity and conductivity are only partially increased. Dye sensitization is believed to be a surface phenomenon, and methods of balancing dye sensitizers and resinous binders to adjust the sensitivity and conductivity of a photoconductor to any level in a range are known per se, to those skilled in the art. In accordance with the present invention, by increasing the sensitivity and conductivity of the subtractive primary colors partially, the overlapping of the subtractive primary color elements to form additive primary color elements will combine to create a relatively higher sensitivity in the areas of overlap to compensate for the narrowed bandpass of admitted light energy. Using a photoconductive paper, the result is an array with highest conductivity and sensitivity additive primary colors, next highest conductivity and sensitivity subtractive primary colors, and lowest speed interstices, which I have found to be an optimum effect. The advantage of this arrangement for the non-imaged pattern of the integral screen of the instant invention is that on exposure to a pure color from the original, such as green, only the higher sensitivity green elements of the integral screen will be sufficiently exposed, because pure colors contain less energy and therefore are inherently darker. In a light green area from the original, the cyan, green, yellow, and to some extent, the interstices will be exposed, adding brightness. The same effect would be achieved with the other colors.

The photoconductive copy paper substrate may be any commercial product which is readily available on the market. Generally, photoconductive paper comprises a suitable base paper, such as 38 in FIGS. 4 and 5 of the drawings, coated with a composition 40 comprising zinc oxide and a resinous binder. Most any type of photoconductive paper which can be used for black and white copying on direct image electrophotographic machines is suitable for use with the present invention. Indeed, one of the outstanding features of this invention is that conventional paper can be used.

Photoconductive copy paper overcoated with an additive acting color system in accordance with this invention as described above can be used with most any existing high speed direct image electrophotographic copying machine by simply placing the paper in the paper supply bin, operating the machine in a normal manner, and recovering a true color copy of a color original. I have found that adjusting the exposure control to 'lighter' gave the best copies.

It is also within the contemplation of this invention to use a conductive substrate which is not necessarily photoconductive provided the color elements contain a photoconductive constituent. Direct image electrophotography according to this invention may therefore also be effected on substrates other that photoconductive copy paper.

Drum transfer XEROGRAPHY can also be used to IMAGE the viewing screen of the instant invention. In drum transfer electrophotography, the latent image is formed on a charged drum which is part of the copying apparatus. Thus, by contrast to the direct image process, the drum transfer process uses a photoconductive element of the apparatus rather than photosensitive paper. However, the operation of a drum transfer machine is similar to that of a direct image machine in that the light from the original image selectively dissipates the charge of the photoconductive receptor leaving a latent charged image which corresponds to the image areas of the original. The toner is applied to the drum and adheres to the charged areas, i.e., the latent image areas. Ordinary paper is then brought into contact with the drum, and the imaged pattern of toner is transferred to the paper. Fixing of the toner as by fusing in the case of dry toner or drying in the case of wet toner, establishes a permanent reproduction on the paper.

In accordance with this invention, a viewing screen comprising any type of ordinary paper used conventionally in xerographc or drum transfer copying apparatus and overcoated with a mosaic array as I have described above under 'screen structure', can be preocessed through a drum transfer machine to give a true color reproduction of a color original if the apparatus is modified to include:

(1) A panchromatic, or red, green, blue, sensitive drum.

(2) Panchromatic, or red, green, blue, emissive exposure lights.

(3) A taking screen is added to the exposing optics to separate the light of the original image into its constituent colors.

(4) The final image is affixed to a sheet that has been overcoated with a non-imaged additive-acting pattern of minute color elements to form a viewing screen in accordance with this invention.

(5) A registration system is used to align the black color-coded toner image and the pre-coated sheet.

In operation, the taking screen is interposed at a focal plane in the exposing optics to spatially separate the image colors as a coded latent image on the photoconductive drum. Simultaneously, as the viewing screen is being drawn from the supply bin and aligned by the registration system, the drum revolves to become charged and then exposed. The exposed drum further revolves to become selectively coated with black toner which is then transferred to the viewing screen and fixed by fusing to form the finished copy.

Panchromatic photosensitive drums for drum transfer electrophotographic copying machines are readily available. If such a drum is substituted for the conventional drum of any presently available drum transfer copying machine, color photocopying can be effected using a viewing screen in accordance with this invention.

A taking screen for use according to this invention may be a transparent substrate overcoated with an additive acting mosaic which corresponds to the mosaic array of the viewing screen which is used, but in which the array is proportionally slightly smaller than that of the viewing screen to compensate for the slight enlargement in image effected by drum transfer machines. The transparency taking screen is interposed between the original and the copy glass of the machine and thereby serves to separate the original image into its constituent colors. This produces a color-coded latent image on the drum.

In accordance with the invention, the taking screen may be constructed by printing the mosaic on a transparent substrate, such as a sheet of clear plastic, e.g., Mylar or the like, or by forming a transparency of the viewing screen mosaic as by conventional photographic techniques, or by color electrophotography. An extensive treatise on taking screens and the Mosaic Additive system in general may be found in the book "Wall's History of Three Color Photography" by E. J. Wall, Focal Press 1970 (ISBN 0-8038-8954-2).

Because of the slight, about 1% to 2%, enlargement in size which sometimes is designed into xerographic processing, it is preferred in those cases that the mosaic of the taking screen be proportionally smaller than that of the viewing screen by the amount of enlargement. This improves the registration of the reproduced image and color on the viewing screen, although it is not essential to the achievement of satisfactory registration. Enlargement techniques known in the photographic arts can be used in this regard. Where the lens of the copying machine is easily adjusted to a magnification ration of 1:1, that is the simplest and preferred means of avoiding distortion due to differences in the mosaic patterns of the taking and viewing screens.

As disclosed above, the taking screen may be placed on the copy glass of the xerographic machine and the image may be placed on top of the taking screen. It is within the concept of this invention to more permanently install a taking screen or optical filter at a focal plane between the drum and the copy glass.

In accordance with the concept of the invention, the taking screen preferably has neutral gray intersticies. This leads to the formation of intersticial areas on the viewing screen which vary in optical density in correspondence to equivilant areas of the orginal image.

In order to achieve proper registration when the image is transferred from the drum to the viewing screen, hand registration can be effected by transferring the image from the drum to a clear transparent sheet, such as Mylar or the like, and overlaying that sheet on a substrate coated with an additive-acting mosaic corresponding to the mosaic of the taking screen. The imaged overlay put in registration with the viewing screen by hand reveals a true color copy of the original image.

A viewing screen suitable for use in drum transfer photocopying in accordance with this invention comprises any substantially opaque, substantially white substrate, such as ordinary paper, overcoated with an additive-acting mosaic array of color elements as has been described above.

Color element compositions which are useful in this embodiment of the invention advantageously comprise a luminescent colorant composition, where luminescence is desired to be used to enhance brightness, resin binder and solvent. Conventional lithographic or printing inks modified by the addition of lumnescent materials as described above to the non-luminescent materials conventionally used are suitable color element compositions for drum transfer photocopying. Since drum transfer processes do not use photoconductive paper, it is unnecessary to use either photoconductive constituents, conductive resins or dye sensitizers in the color elements.

It has been found that a particularly good substrate for use according to this embodiment of the invention is a resin-coated paper as is conventionally used in color printing. The advantage of such a paper is that the coating provides both higher reflectance of light for brightness and greaer dimensional stability for registration. Synthetic paper such as manufactured by Kimberly-Clark stated above under "screen structure" is also available.

To form the mosaic on the substrate the same methods may be used as have been describde under "screen structure". Rotogravure printing is again a suitable application technique. In addition, lithography may be advanageously used. The pattern may be the same as any of those mentioned with respect to any other embodiment of this invention. For example, an array as shown in FIG. 1 using six-point star-shaped color elements such as that shown in FIG. 2 is useful in xerographic or drum transfer processing.

It is presently preferred to use a non-imaged pattern of parallel lines as the mosaic for both the viewing screen and the taking screen to effect simplest registration in the xerographic mode of processing in accordance with the invention. I have found that the lines should preferably run in the direction of feed of the viewing screen into the copying machine. As with other embodiments, the use of photoluminescent colorant compositions with an array formed from additive primary color elements gives good color reproductions. Preferred is an additive-acting array formed from partially overlapping subtractive primary color elements such as is described above under "screen structure" herein. The substrate is substantially opaque, and substantially white so that any resulant intersticial areas where not subsequently overcoated with the coded black image, become one means of increasing the brightness as taught herein.

FURTHER CONSIDERATIONS

By the methods described herein, rapid color copying can be effected in a number of otherwise black and white image reproduction processes. For example, they may be applied to any processes where it is desired to produce a color image in a single impression on opaque stock to be viewed by reflected light, including reflectance color: television, printing, facsimile, photography, and xerography.

Disclosed herein are concepts of increasing the brightness of the Mosaic Additive system having broad applicability. The use of luminescent colorant compositions to form a Mosaic Additive system, the use of subtractive primary colors to produce a Mosaic Additive system of enhanced brightness, and the use of variable density interstices, whether such uses are individual or in combination, portend a host of practical improvements throughout the spectrum of the color reproduction arts. This invention in the broadest sense takes the basic concept of the Additive Mosaic system into long sought realms of application with opaque stock heretofore believed impossible, as evidenced by reference to U.S. Pat. No. 1,191,034 (circa 1916) entitled "Color Photography and Color Printing" issued to Julius and Ernest Rheinberg, Pg. 1, lines 66-96, which illustrates that long desire to obtain this end; and makes true color reproduction accessible to virtually everyone.

Additional modifications will readily occur to those skilled in the art. For example, colors other than the additive and subtractive primaries may also be used in juxtaposition, such as oranges, purples, shades of greens, pinks, browns, etc. The Pantone Matching System mentioned above herein lists 497 different colors and shades mixable by formula from ten (10) basic colors comprising the six (6) additive and subtractive primaries, purple, warm red (a reddish-orange), black and transparent white. Also, improvements in the quality of the appearance of color would generally be applicable to enhancing the appearance of color copies made in accordance with this invention. Illustrative of such improvements are those taught in U.S. Pat. No. 2,850,563 entitled "Process for the Reproduction of Images in Color" and issued to E. Gretner, relating to the adjustment of the CIE color coordinates of the color primaries so that the flesh tones are precisely duplicated. It is apparent that the color coordinates of the color areas and/or the overlay of my invention can be relativerly adjusted to those CIE color coordinates to respond accurately to the flesh tones to give a color reproduction most pleasing to the eye. Therefore terms herein such as 'neutral', 'achromatic', 'gray', 'white', 'black', 'additive primary', 'subtractive primary', etc. are intended as 'substantially' or 'approximently' so.

Images on the viewing screen of this invention would also appear brighter if a dark border is provided around the edge of each finished copy. This can be done by applying a dark composition at the time of viewing screen manufacture. Alternatively, a dark overcoating may be applied during image formation on the viewing screen, such as by blocking light around the edge during exposure in the case of photosensitive processes, causing the border to remain unexposed and therefore become dark on development, or by otherwise constructing the image to create a dark border as it creates the picture.

The scientific term for reflection optical density is 'albedo', and is intended to be included herein as a descriptor.

The subtractive primaries in the finished viewing screen of this invention act additively to the eye to help form the colors, as do the additive primaries and the interstices.

The invention in its broader aspects is therefore not limited to the specific details shown and described, but departures may be made from such details without departing from the spirit and scope of the invention. For example, combining the screen of the instant invention with LCD's and a lenticular front surface portends the proverbial "3-D Dick Tracy Color Wrist TV".

I claim:

1. A Mosaic Additive reflectance color display screen of enhanced brightness, comprising:
    a display screen, including a neutral color-reflective substrate, a nonimaged color mosaic system of color areas on the substrate, the color areas of the system being discrete and of relatively small size; the color areas being comprised of first, additive primary color areas being separated from each other by second, subtractive primary color areas;
    a separation record means superimposed upon said system of color areas and being composed of discrete areas outlining and defining an image and acting to selectively alter the optical density of individual ones of the color areas of the system so that, upon illuminating the screen by ambient light, an image, corresponding in both color and pattern to an original image, can be seen by an observer, whereby the small size areas, as seen, act additively to the eye.

2. The display screen of claim 1, comprising additional white reflective interstices between some of the color elements.

3. The display screen of claim 1, said substrate being a substantially white substrate.

4. The display screen of claim 1 or 2, said color areas being daylight fluorescent.

5. The display screen as in claim 1, said Mosaic Additive acting color resulting from adjacent and overlapping subtractive primary color areas.

6. A method of reproducing an original image in both color and pattern, comprising the steps of
    providing a taking screen composed of nonimaged mosaic-like color filter areas;
    providing a multicolor image through said taking screen and generating thereby a separation record defining discrete areas capable of modulating optical brightness of reflected and/or transmitted radiation;

providing a reflective display screen composed of nonimaged brightness-enhanced mosaic-like reflective color areas, corresponding in pattern, geometric extension, and mutual orientation to said mosaic-like color filter areas of said taking screen; and superposing a separation record, corresponding to or being said separation record upon said display screen to obtain blocking of any reflected return radiation from the display screen, locally selective in correspondence to said discrete areas for selectively lowering local optical brightness of the respective color areas of the display screen, the return radition from the viewing screen as locally modulated in respect of intensity by the separation record delineating a color image.

7. A method as in claim 6, wherein the taking screen and the display screen are the same.

8. A method as in claim 6, wherein the color areas of the display screen include additive primary color areas bounded by subtractive primary color areas.

9. A method as in claim 8, using a taking screen where the color areas are directly bounding additive primary color areas.

10. A method of reproducing an original image in both color and pattern, comprising the steps of providing a taking screen composed of nonimaged mosaic-like color filter areas;

providing a multicolor image through said taking screen and generating thereby a separation record defining discrete areas capable of modulating optical brightness of reflected and/or transmitted radiation;

providing a display screen, incliding a neutral color-reflective substrate, a nonimaged color mosaic system of daylight fluorescent color areas on the substrate, the color areas of the system being discrete and of relatively small size and correspond in pattern, geometric extension, and mutual orientation to said mosaic-like color filter areas of said taking screen, the color areas being comprised of first, additive primary color areas being separated from each other by second, subtractive primary color areas; and superimposing the separation record means upon said system of color areas so that said discrete areas outlining and defining the image, act to selectively alter the optical density of individual ones of the color areas of the system so that, upon illuminating the screen by ambient light, an image, corresponding in both color and pattern to the original image, can be seen by an observer, whereby the small size areas, as seen, act additively to the eye.

* * * * *